F. MARZAK.
KNIFE.
APPLICATION FILED APR. 6, 1912.
1,037,648.
Patented Sept. 3, 1912.
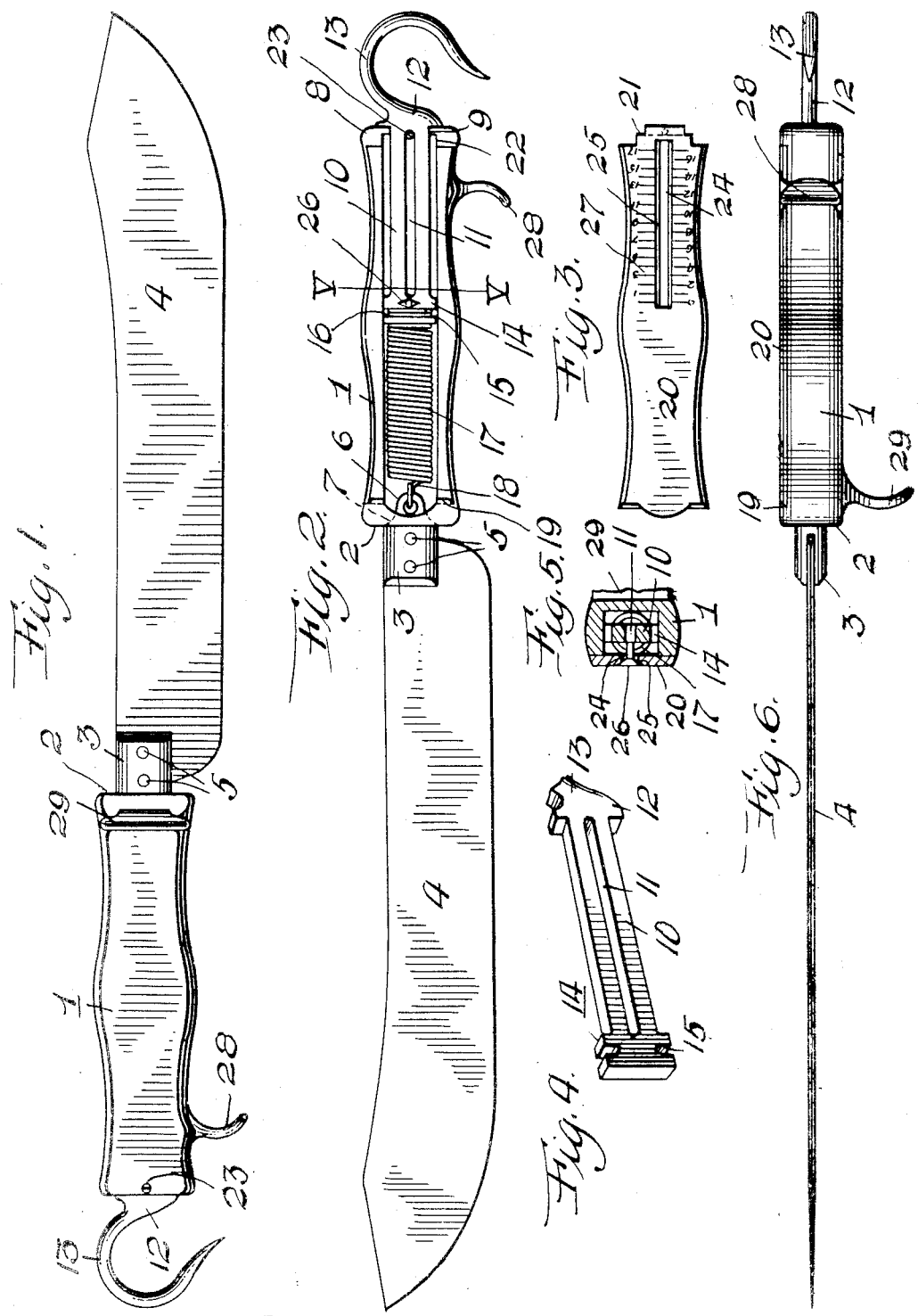
WITNESSES
Samuel Payne
Ralph C. Evert.
INVENTOR
F. Marzak,
BY
ATTORNEYS

UNITED STATES PATENT OFFICE.

FRANK MARZAK, OF COLLEGE POINT, NEW YORK.

KNIFE.

1,037,648.

Specification of Letters Patent.   Patented Sept. 3, 1912.

Application filed April 6, 1912.  Serial No. 688,891.

*To all whom it may concern:*

Be it known that I, FRANK MARZAK, a subject of the Emperor of Austria-Hungary, residing at College Point, in the county of Queens and State of New York, have invented certain new and useful Improvements in Knives, of which the following is a specification, reference being had therein to the acompanying drawing.

This invention relates to knives, and the primary object of my invention is to embody a scale within the handle of a knife, whereby a piece of meat or other matter can be weighed.

Another object of this invention is to provide a combined knife and scale of novel construction that permits of either being safely used.

A further object of this invention is to accomplish the above results by a mechanical construction that will be hereinafter specifically described and then claimed.

Reference will now be had to the drawing, wherein:—

Figure 1 is a side elevation of the knife, Fig. 2 is a similar view with the handle plate thereof removed, Fig. 3 is a side elevation of a detached handle plate, Fig. 4 is a perspective view of a detached scale frame, Fig. 5 is a cross sectional view of the knife taken on the line V—V of Fig. 2, and Fig. 6 is a bottom plan of the knife.

A knife in accordance with this invention comprises a handle casing 1 having the outer end wall 2 thereof provided with parallel blade holders 3 for the inner end of a blade 4 that is riveted or otherwise connected, as at 5 to the holders 3. The inner end of the blade 4 is reduced to provide an eye 6 and said eye extends through an opening 7 into the handle casing 1.

The inner wall 8 of the handle casing has an opening 9 and movably mounted within said opening is a scale frame 10 that has a longitudinal slot 11. The scale frame has the outer end thereof enlarged, as at 12 and provided with a hook 13. The inner end of the scale frame has a head 14 provided with grooves 15 and engaging in said grooves are the convolutions 16 of a coiled retractile spring 17, said retractile spring having the end thereof attached to the eye 6, as at 18.

One side of the handle casing is open, as illustrated in Fig. 2 and the end wall 2 of said casing is beveled, as at 19 to receive the beveled end of a handle plate 20, said plate having the opposite end thereof stepped, as at 21 to fit in the stepped portion of the wall 8. The handle plate is retained in engagement with the handle casing by a screw 23 that extends through the slot 11 of the scale frame to limit the movement of said frame. The handle plate 20 has a longitudinal slot 24 with the walls thereof beveled, as at 25. Movable within said slot is a pointer 26 carried by the inner end of the scale frame 10. The pointer is flush with the outer surface of the handle plate 20, and said handle plate, at the sides of the slot 24, is graduated, as at 27. The lower side of the handle casing has a finger guard 28 and the rear wall of the handle casing has a finger guard 29 located adjacent to the wall 2, said guards permitting of the hand firmly and safely gripping the handle.

As the knife is used in slicing meat, immediately upon a cut being made, the knife can be manipulated whereby the hook 13 can be swung into engagement with a piece of meat to elevate and weigh the same. With a little practice, the manipulation of the knife can be used to an advantage, thereby rendering it unnecessary for the hands to touch the pieces of meat. The weight of the piece of meat having been ascertained, it can be carried to the wrapping paper and deposited thereon, wrapped and delivered without the hands touching the same.

Besides the knife being advantageously used by butchers, it can be used in culinary departments and employed for weighing other matter than meat.

The knife blade is made of steel and the handle casing and handle plate can be made of aluminum or other light durable material.

What I claim is:—

The combination in a knife, of a hollow handle, a knife blade having a tang, said tang extending through one end of the handle and rigidly attached thereto, said knife blade being thereby held in line with said handle, a retractile spring in the handle, having one end attached to the tang of said blade, a scale frame slidably positioned in the handle and connected to the opposite end of said spring.

In testimony whereof I affix my signature in the presence of two witneses.

FRANK MARZAK.

Witnesses:
   STANLEY ANSEK,
   C. LOYWIZE.